April 16, 1929.  C. W. BRISTOL  1,709,561
COMPENSATED ABSOLUTE PRESSURE GAUGE
Filed June 1, 1928  2 Sheets-Sheet 1

INVENTOR
Carlton W. Bristol
BY
ATTORNEY

April 16, 1929.  C. W. BRISTOL  1,709,561
COMPENSATED ABSOLUTE PRESSURE GAUGE

Filed June 1, 1928  2 Sheets-Sheet 2

INVENTOR
Carlton W. Bristol
BY
ATTORNEY

Patented Apr. 16, 1929.

1,709,561

UNITED STATES PATENT OFFICE.

CARLTON W. BRISTOL, OF NAUGATUCK, CONNECTICUT, ASSIGNOR TO THE BRISTOL COMPANY, OF WATERBURY, CONNECTICUT, A CORPORATION OF CONNECTICUT.

COMPENSATED ABSOLUTE-PRESSURE GAUGE.

Application filed June 1, 1928. Serial No. 282,247.

The invention relates to measuring instruments, more particularly to a device or gauge for measuring absolute pressures of fluids; and embodies a gauge of the so-called Bourdon tube type. It has for its object to provide means in connection therewith to compensate for the effects of variations in barometric pressure of the surrounding atmosphere. Apparatus of this type is particularly desirable in connection with the measurement of absolute pressures such as prevail, for example, in condensers and the absolute static pressures of gas lines equipped with flowmeters.

In carrying out this invention, the Bourdon tube is constructed of two non-communicating but connected sections, one of which is rigidly secured at one end and arranged to communicate at this point with the fluid whose pressure is to be determined while the other is substantially evacuated and has connected with its free end a measuring member or pointer for indicating or recording the changes in pressure of the fluid.

The nature of the invention, however, will best be understood when described in connection with the accompanying drawings, in which.

Figure 1:
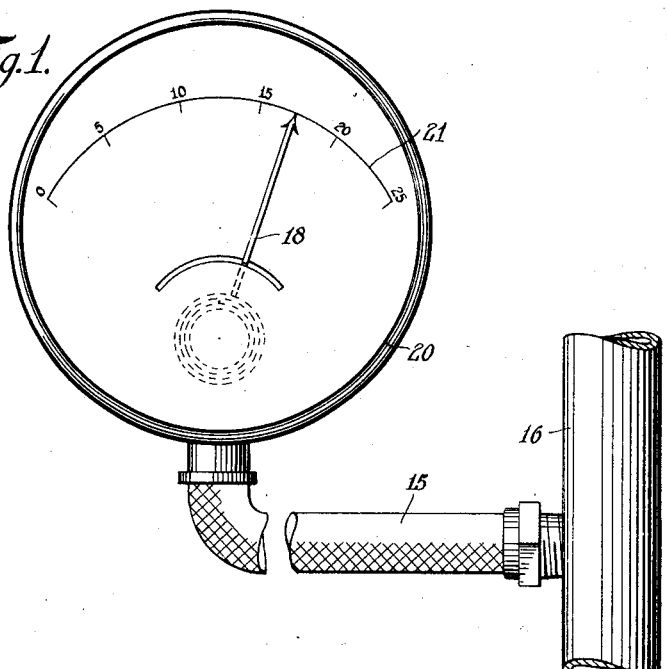
Fig. 1 is a front elevation of an indicating pressure gauge connected to a source of fluid whose pressure it is desired to indicate on the said gauge.
Figure 2:
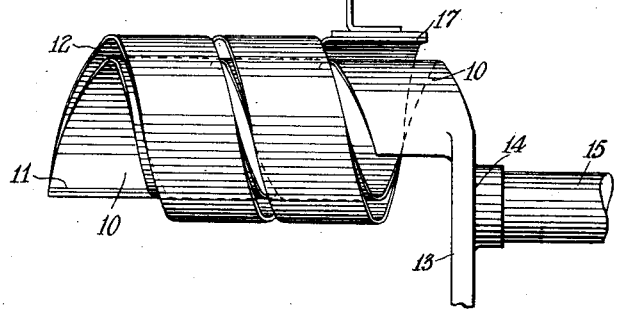
Fig. 2 is a side elevation, on an enlarged scale, of the actuating and compensated Bourdon tube utilized in the novel absolute-pressure gauge.

Referring to the drawings, 10 designates one section of a Bourdon tube, preferably of the flattened type and helically wound in a plurality of convolutions. This tube is closed at its outer end 11 where it is joined to a further tube section 12 similarly coiled and arranged about and coaxially with the said first-named section 10. The latter at its inner end is secured to a bracket 13 or other fixed support and is provided also with an opening or connection 14 whereby communication may be had, as through a suitable connecting tube 15, between the interior of said section and a source of fluid supply represented by the pipe 16, for example, of a gas line. The outer or compensating section 12 does not communicate with the interior of the section 10; and, furthermore, it is sealed at its inner end 17 to which is secured, preferably directly, the measuring arm or pointer member 18. The said section, furthermore, is arranged to be evacuated substantially to complete vacuum.

The whole actuating mechanism hereinbefore described is mounted and enclosed with a suitable casing 20 having a graduated dial 21 over which pointer 18 is designed to move to indicate the different pressures in accordance with the conditions prevailing in the fluid supply source 16.

In the operation of measuring apparatus embodying the Bourdon type of actuating member, it will be appreciated that the tendency of such tubes is to straighten out or uncoil under the influence of internal pressure, that is to say, in accordance with the difference in the pressure prevailing within the tube and that surrounding the same.

Apparatus of this type is, therefore, subject to variations in the pressure of the surrounding atmosphere and errors will be introduced thereby in the indications afforded by the instrument of the pressure of the fluid to which said instrument is connected. In accordance with the invention and more particularly through the provision of the compensating section 12 of the tube, the effect of the pressure variations in the surrounding atmosphere are neutralized, more especially in view of the fact that said section, being wound in the same direction as the actuating section 10, operates to move the pointer member 18 over the scale 21 in a direction opposite to that which the actuating section would move the same under similar pressure changes in the surrounding atmosphere, and in equal amounts for the same change.

This will secure a correct indication of the absolute-pressure applied to the actuating section through the connection 16 thereto; and there is, furthermore, no disturbing effect due to variations in temperature on the compensating section since the latter is substantially evacuated. By this expedient, therefore, a very simple device is provided for obtaining correct and reliable indications of absolute-pressure. It will be understood, moreover, that when there is no variation of external pressure, the compensating section participates in either direction of movement of the pointer member as actuated by the remaining section of the tube without exerting any appreciable retarding action thereon. The two sections are, also, made of equal strength and therefore equal pressure variations will effect the same degree of angular movement in each.

Figure 3:
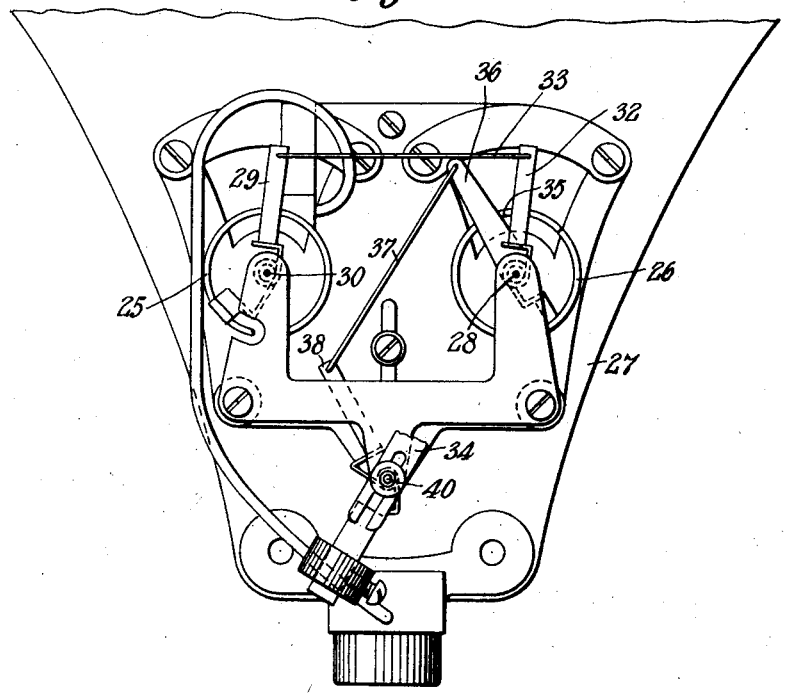
Fig. 3 is a fragmentary front elevation.
Figure 4:
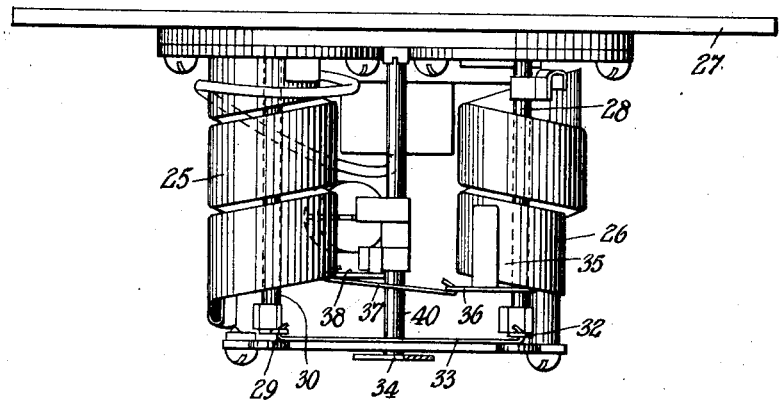
Fig. 4 is a similar plan view, illustrating a modification in the arrangement of interconnecting the actuating mechanism.

Moreover, the two sections need not be coaxially mounted and directly connected to each other as hereinbefore set forth; but, as illustrated in Figs. 3 and 4, two independently mounted tubes 25 and 26 are provided, the former being secured at its inner end to a back or supporting casing plate 27, while the latter tube is rigidly connected at its inner end to a shaft 28 mounted to oscillate on the plate 27. The arrangement is such, moreover, that the free ends of the two tubes move in opposite directions with similar changes in applied pressures. The said ends, moreover, are interconnected in the following manner so that the one tube, as tube 26, which is the substantially evacuated one, may serve to apply the requisite correction to the other, which is to be connected with the source of fluid whose variations in pressure it is desired to measure.

To this end, a linkage system is included between the two said tubes and embodies the radially extending arm 29 movable with a shaft 30 secured rigidly to the free end of tube 25 and located axially therein. The tube 26, likewise, carries an arm 32 which is adapted to partake of angular movement of the shaft 28; and the two arms 29 and 32 are connected at their outer ends by means of a link 33 so that angular movement of either tube will be communicated to the other. The indicating pointer 34, however, is to be connected with the evacuated tube 26, as at its free end 35, for example, by means of an arm 36 attached thereto and connected by means of a link 37 with a crank arm 38. The latter extends from an indicator arm shaft 40 which is rotatably mounted on the casing, whereby changes of pressure, occurring at normal atmospheric pressures, within the tube 25 will cause corresponding movement of the said indicator arm; but if the atmospheric pressure departs from the normal, tube 26 will be correspondingly affected and the movement of its free end 35 will resist or increase accordingly the movement communicated by said tube 25 and thus compensate the same to the normal pressure.

In initially setting the novel gauge, the pointer is adjusted, for example, to read 14.7 lbs. absolute on the scale, with barometric pressure at 30 inches of mercury, and with the open end of the tube in direct communication with the atmosphere. When connected to a source of pressure, if a change in the external atmosphere surrounding the tube and gauge then occurs, say above the 14.7 lbs., this would normally cause the pointer to move below the correct point on the scale corresponding to the applied pressure; but in the present embodiments, the compensating section of the tube will also be equally affected thereby. Since this section operates to move the pointer in the reverse direction, the error will be balanced and a correct indication afforded.

I claim:

1. Absolute-pressure gauge of the Bourdon tube type, embodying a Bourdon tube having one end secured to receive the fluid whose pressure it is desired to measure, and a substantially evacuated extension connected with the other end and whose other end is free, said tube and extension being of equal strength and mounted to move in like directions to oppose each other for like atmospheric or surrounding pressure changes to which they may be exposed, and an arm member connected with the free end of said evacuated extension.

2. Absolute-pressure gauge, comprising a Bourdon tube with secured end and free end and having two connected non-communicating sections of equal strength and coiled to oppose each other, and the one section embodying the free end being substantially completely evacuated, and the other and secured end adapted for connection to a source of fluid supply to receive fluid whose pressure is to be measured, and an arm member connected with the free end of the said tube and responding to angular movement thereof.

3. Absolute-pressure gauge, comprising a Bourdon tube with secured end and free end and having two non-communicating sections of equal strength coiled in the same direction, the one within the other, and the one section embodying the free end being substantially completely evacuated, and the other and secured section adapted for connection to a source of fluid supply to receive fluid whose pressure is to be measured, and an arm member connected with the free end of the said tube and responding to angular movement thereof.

4. Absolute-pressure gauge, comprising a Bourdon tube sealed intermediate its ends and at one end, the sealed-off portion being substantially completely evacuated and of equal strength with the remaining portion, and the other and open end being secured and adapted for communication with a source of fluid whose pressure is to be measured, and an arm member secured to the free end of said tube responding to angular movement thereof.

In testimony whereof I affix my signature.

CARLTON W. BRISTOL.